J. E. Boyle,
Water-Closet Valve.
No. 37,213. Patented Dec. 23, 1862.
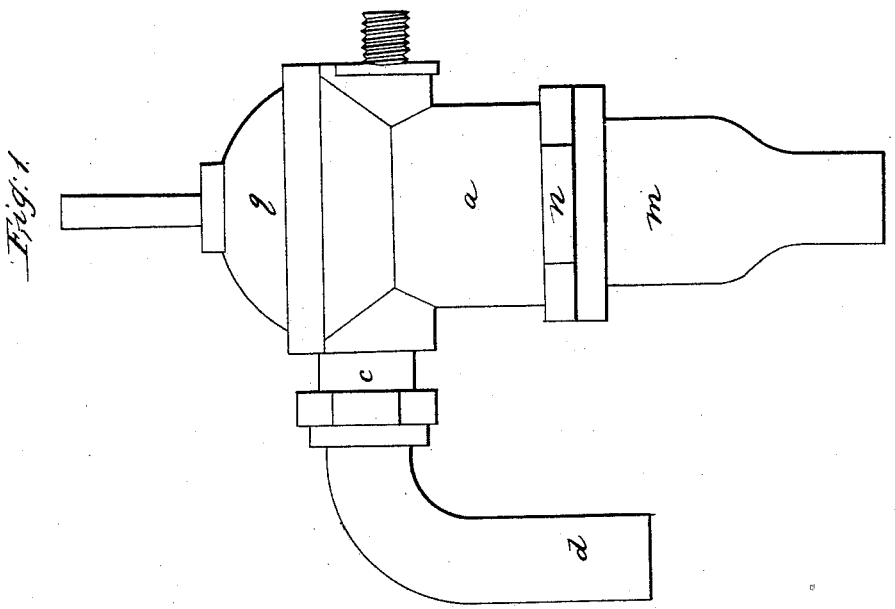
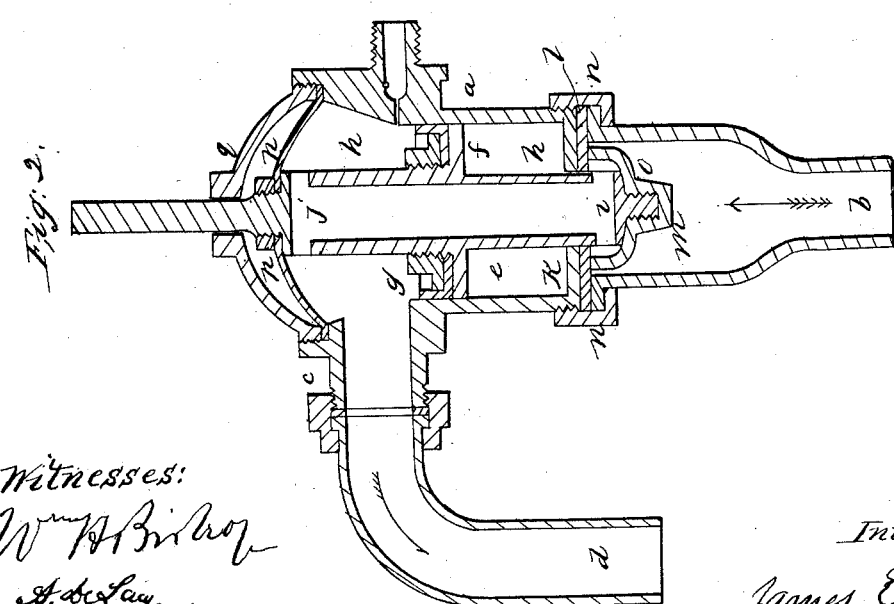
Witnesses:
Wm H Bishop
A. de Lacy
Inventor:
James E Boyle

UNITED STATES PATENT OFFICE.

JAMES E. BOYLE, OF BROOKLYN, ASSIGNOR TO GEORGE STEVENSON, OF NEW YORK, N. Y.

IMPROVEMENT IN VALVES FOR WATER-CLOSETS.

Specification forming part of Letters Patent No. 37,213, dated December 23, 1862.

*To all whom it may concern:*

Be it known that I, JAMES E. BOYLE, of Brooklyn, Kings county, and State of New York, have invented a new and useful Improvement in Cocks or Valves for Water-Closets and other Purposes; and I do hereby declare that the following is a full, clear, and exact description thereof, reference being had to the accompanying drawings, making part of this specification, in which—

Figure 1 is an elevation, and Fig. 2 a longitudinal section.

My said invention relates to an improvement in cocks or valves for supplying water to water-closets and other pans, secured to me by Letters Patent of the United States, bearing date the 3d day of January, 1860, and by means of which said original invention the valve, after being opened, will remain so until there is a supply of water, and then will be closed by the pressure of the water alone, and the closing so controlled or rendered gradual as to insure a sufficient flow of water through it to wash out the pan. By my present improvement I accomplish the same result, but by a more simple and cheap arrangement.

In the accompanying drawings, $a$ represents the body of the cock, which is to be secured at $b$ to the supply-pipe and at $c$ to the discharge-pipe $d$, leading to a pan. The chamber $e$ is cylindrical, and to it is loosely fitted a piston, $f$, so that water can pass, and this piston is provided with a cup-leather, $g$, of the usual construction, so that when moved downward in the chamber or cylinder $e$ water may pass between the cylinder and said cup-leather, but when moved upward the pressure of the water on the inside of the cup-leather shall press it outward to pack the joint. Any of the known equivalents may be substituted for this piston. The piston $f$ is on a hollow stem, $h$, formed with lateral apertures or water-ways $i$ and $j$, one near the bottom and the other near the top. The lower end of this stem is cylindrical, and slides in a central aperture in the bottom $k$ of the cylinder and through a packing-leather, $l$, which is secured to the under side of the bottom of the cylinder by being clamped between it and the lower part, $m$, of the cock by a coupling-nut, $n$. To the lower end of the stem is secured a cup-valve, $o$, the upper rim of which, when the stem is pushed up, bears against the under face of the packing-leather, and prevents the passage of the water from the induction or supply pipe; but when the stem is depressed the water from the supply-pipe passes freely all around to and through the induction-ways $i$, near the lower end, to the inside of the hollow stem, up through that, and out through the eduction-ways $j$, near the upper end of the stem, to the inside of the cock, and thence to the discharge-pipe. Just above the eduction-ways $j$ the stem passes through the center of a flexible diaphragm, $p$, to which it is properly secured by a water-tight joint. And the edge of this diaphragm is secured to a seat in the top of the body of the cock, in which it is gripped by the edge of a metal cap, $q$, which is tapped and screwed into place. This diaphragm I prefer to make of that preparation of vulcanized india-rubber generally known as "packing;" but it may be made of any other suitable flexible substance. The surface of this diaphragm presents a greater area than the surface of the piston $f$, and in consequence, as the water under pressure flows into the cock, it will exert a greater force upward against the diaphragm than downward on the piston $f$, and hence the stem will be forced upward until the cup-valve $o$ is brought in contact with the packing-leather $l$, which shuts off the flow of water. There is a slight aperture, made either by cutting a notch in the inner periphery of the bottom $k$ of the cylinder and the packing-leather $l$, or otherwise formed, so as to allow water to flow slowly into the cylinder while the valve is open to permit the piston to be moved up in the cylinder by the pressure of the water against the inner surface of the diaphragm $p$. It is the slow filling of the cylinder below the piston which prevents the sudden closing of the valve, and the size of the aperture relatively to the capacity of the cylinder will determine the length of time required to close the valve, hence the duration of the flow of water to wash the pan. The stem extends up through a hole in the cap $q$, where the requisite attachment can be made or applied for opening the valve, and either the stem should be so loose in the cap as to allow air to flow freely, or an aperture should be made in the cap for that purpose.

It will be obvious that a piston with an inverted cup-leather packing and fitted to a cylinder may be substituted for the flexible diaphragm, although I prefer the flexible diaphragm.

What I claim as my invention, and desire to secure by Letters Patent, is—

The hollow valve-stem, with its lateral induction and eduction water-ways, substantially as described, in combination with the induction-valve, sliding piston, and cylinder, provided with a small aperture or leak to control the closing of the valve, and the diaphragm, or the equivalent thereof, for closing the valve by the pressure of the water alone, substantially as and for the purpose specified.

JAMES E. BOYLE.

Witnesses:
 WM. H. BISHOP,
 A. DE LACY.